(12) United States Patent
Jain et al.

(10) Patent No.: US 9,177,066 B2
(45) Date of Patent: Nov. 3, 2015

(54) METHOD AND SYSTEM FOR DISPLAYING COMMENTS ASSOCIATED WITH A QUERY

(75) Inventors: Vidit Jain, Bangalore (IN); Sourangshu Bhattacharya, West Bengal (IN)

(73) Assignee: Yahoo! Inc., Sunnyvale, CA (US)

( * ) Notice: Subject to any disclaimer, the term of this patent is extended or adjusted under 35 U.S.C. 154(b) by 198 days.

(21) Appl. No.: 13/517,606

(22) Filed: Jun. 14, 2012

(65) Prior Publication Data
US 2013/0339342 A1    Dec. 19, 2013

(51) Int. Cl.
*G06F 17/30* (2006.01)

(52) U.S. Cl.
CPC ............... *G06F 17/30867* (2013.01)

(58) Field of Classification Search
None
See application file for complete search history.

(56) References Cited

U.S. PATENT DOCUMENTS

| | | | |
|---|---|---|---|
| 8,346,791 B1 * | 1/2013 | Shukla et al. | 707/759 |
| 2011/0145219 A1 * | 6/2011 | Cierniak et al. | 707/709 |
| 2011/0208669 A1 * | 8/2011 | Ruhl et al. | 705/347 |
| 2012/0124039 A1 * | 5/2012 | Sandholm et al. | 707/724 |
| 2012/0330968 A1 * | 12/2012 | Lee et al. | 707/748 |
| 2013/0066800 A1 * | 3/2013 | Falcone et al. | 705/347 |

* cited by examiner

*Primary Examiner* — Rehana Perveen
*Assistant Examiner* — Raheem Hoffler
(74) *Attorney, Agent, or Firm* — Brinks Gilson & Lione

(57) ABSTRACT

A method and system for displaying comments associated with a query. The method includes receiving the query provided by a user, retrieving a set of comment clusters from a comment cluster database, selecting engaging comments from each comment cluster included in the set of comment clusters, aggregating the engaging comments that are obtained from each comment cluster, identifying a plurality of independent comments included in a list of aggregated comments and displaying a list of engaging comments to the user. The system includes an electronic device, a communication interface and a memory. The system also includes a processor to receive the query, retrieve a set of comment clusters, select engaging comments from each comment cluster, aggregate the engaging comments, identify a plurality of independent comments and display a list of engaging comments to the user.

17 Claims, 3 Drawing Sheets

METHOD AND SYSTEM FOR DISPLAYING COMMENTS ASSOCIATED WITH A QUERY

TECHNICAL FIELD

Embodiments of the disclosure relate to the field of providing search results for a query and more specifically to displaying various comments associated with the query.

BACKGROUND

Users are increasingly using Internet for querying various entities. A query is provided as an input, by the users, in various forms. In one example, the users can type the query in a search box provided by a search engine, for example Yahoo! Search engine. Multiple search results for the query are displayed, on a web page, in response to providing the query. The search results are displayed, to the users, in various formats. Examples of the formats include web results, image results, video results, news results and blog results.

The search results also have comments associated with the query that are provided by one or more users. The comments on the query, in one example, include data associated with the query that enables the users to obtain valuable information associated with the query. Further, the comments are provided in an interactive manner that enables the users to understand the query distinctly. However, the comments on the query are usually not displayed on the web page due to spam and abusive content present in the comments.

Conventionally, web feeds from various social networking sites, for example twitter feeds from twitter, are displayed to the user. However, the twitter feeds are personal and, unlike the comments, are not interactive.

In the light of the foregoing discussion there is a need for an efficient method and a system for displaying comments associated with the query.

SUMMARY

The above-mentioned needs are met by a method, a computer program product and a system for displaying comments associated with a query.

An example of a method of displaying comments associated with a query includes receiving the query provided by a user. The method also includes retrieving a set of comment clusters from a comment cluster database. Each comment cluster of the set of comment clusters includes a plurality of comments associated with the query. The method further includes selecting engaging comments from each comment cluster included in the set of comment clusters. The engaging comments are identified based on a plurality of attributes. Further, the method includes aggregating the engaging comments that are obtained from each comment cluster, with each other, to form a list of aggregated comments. Further, the method includes identifying a plurality of independent comments included in the list of aggregated comments. The plurality of independent comments is classified into one or more topics associated with the query. Moreover, the method includes displaying a list of engaging comments to the user. The list of engaging comments is selected from the plurality of independent comments which corresponds to the one or more topics associated with the query.

An example of a computer program product stored on a non-transitory computer-readable medium that when executed by a processor, performs a method of displaying comments associated with a query. The computer program product includes receiving the query provided by a user. The computer program product also includes retrieving a set of comment clusters from a comment cluster database. Each comment cluster of the set of comment clusters includes a plurality of comments associated with the query. The computer program product further includes selecting engaging comments from each comment cluster included in the set of comment clusters. The engaging comments are identified based on a plurality of attributes. Further, the computer program product includes aggregating the engaging comments that are obtained from each comment cluster, with each other, to form a list of aggregated comments. Further, the computer program product includes identifying a plurality of independent comments included in the list of aggregated comments. The plurality of independent comments is classified into one or more topics associated with the query. Moreover, the computer program product includes displaying a list of engaging comments to the user. The list of engaging comments is selected from the plurality of independent comments which corresponds to the one or more topics associated with the query.

An example of a system for displaying comments associated with a query includes an electronic device. The system also includes a communication interface in electronic communication with the electronic device. The system further includes a memory that stores instructions. Further the system includes a processor responsive to the instructions to receive the query provided by the user. The processor is also responsive to the instructions to retrieve a set of comment clusters from a comment cluster database. Each comment cluster of the set of comment clusters includes a plurality of comments associated with the query. The processor is further responsive to the instructions to select engaging comments from each comment cluster included in the set of comment clusters. The engaging comments are identified based on a plurality of attributes. Further, the processor is responsive to the instructions to aggregate the engaging comments that are obtained from each comment cluster, with each other, to form a list of aggregated comments. Furthermore, the processor is responsive to the instructions to identify a plurality of independent comments comprised in the list of aggregated comments. The independent comments are classified into one or more topics associated with the query. Moreover, the processor is responsive to the instructions to display a list of engaging comments to the user. The list of engaging comments is selected from the independent comments and further the list of engaging comments corresponds to the one or more topics associated with the query.

BRIEF DESCRIPTION OF THE FIGURES

In the accompanying figures, similar reference numerals may refer to identical or functionally similar elements. These reference numerals are used in the detailed description to illustrate various embodiments and to explain various aspects and advantages of the present disclosure.

DETAILED DESCRIPTION OF THE EMBODIMENTS

The above-mentioned needs are met by a method, computer program product and system for displaying comments associated with a query of a user. The following detailed description is intended to provide example implementations to one of ordinary skill in the art, and is not intended to limit the invention to the explicit disclosure, as one or ordinary skill in the art will understand that variations can be substituted that are within the scope of the invention as described.

Figure 1:
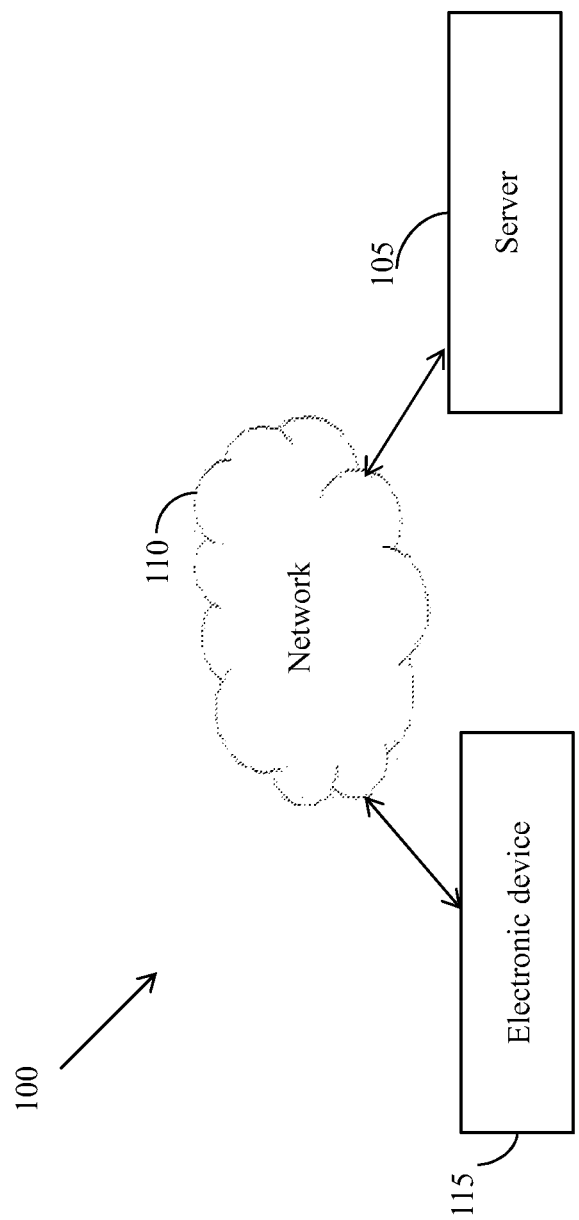
FIG. 1 is a block diagram of an environment, in accordance with which various embodiments can be implemented.

FIG. 1 is a block diagram of an environment 100, in accordance with which various embodiments can be implemented.

The environment 100 includes a server 105 and an electronic device 115. The electronic device 115 can communicate with the server 105 through a network 110. Examples of the electronic device 115 include, but are not limited to, a computer, a mobile phone, a laptop, a palmtop, a hand held device and a personal digital assistant (PDA).

The server 105 is in electronic communication with the electronic device 115 through the network 110. The server 105 can be located remotely with respect to the electronic device 115. Examples of the network 110 include, but are not limited to, a Local Area Network (LAN), a Wireless Local Area Network (WLAN), a Wide Area Network (WAN), internet, and a Small Area Network (SAN).

In some embodiments, an electronic device 115 can perform functions of the server 105.

A user of the electronic device 115 accesses a web page, for example Yahoo!®, via the electronic device 115 and enters a query in a search engine, for example Yahoo!® Web Search. The query can be provided in various formats. Examples of the formats include, but are not limited to, text, image and voice.

In one example, the user can type the query in a search box of the search engine. In another example, the user can click on the query, for example, trending entities listed on the web page. The query for a particular subject, for example a celebrity, is communicated to the server 105 through the network 110 by the electronic device 115 in response to the user inputting the query.

The server 105 communicates the query to a retrieval engine included in the server 105. The retrieval engine retrieves a set of comment clusters associated with the query entered by the user. The comment clusters associated with the query are retrieved from a comment cluster database.

The comment cluster database maintains comment clusters, including multiple comments, associated with multiple queries. The comments are provided online by one or more users. The set of comment clusters are then analyzed, by the server 105, to select engaging comments from each comment cluster of the set of comment clusters. The engaging comments include comments that possess a higher degree of relevance to the query.

Further, the engaging comments obtained from each comment cluster are aggregated, with each other, to form a list of aggregated comments.

Further, a plurality of independent comments included in the list of aggregated comments is identified by the server 105.

The server 105 then selects a list of engaging comments from the independent comments. Upon selection, the list of engaging comments is displayed to the user. The list of engaging comments can include data that enables the user to obtain useful information associated with the query. Hence, the list of engaging comments can solve a purpose of the user.

Figure 2:
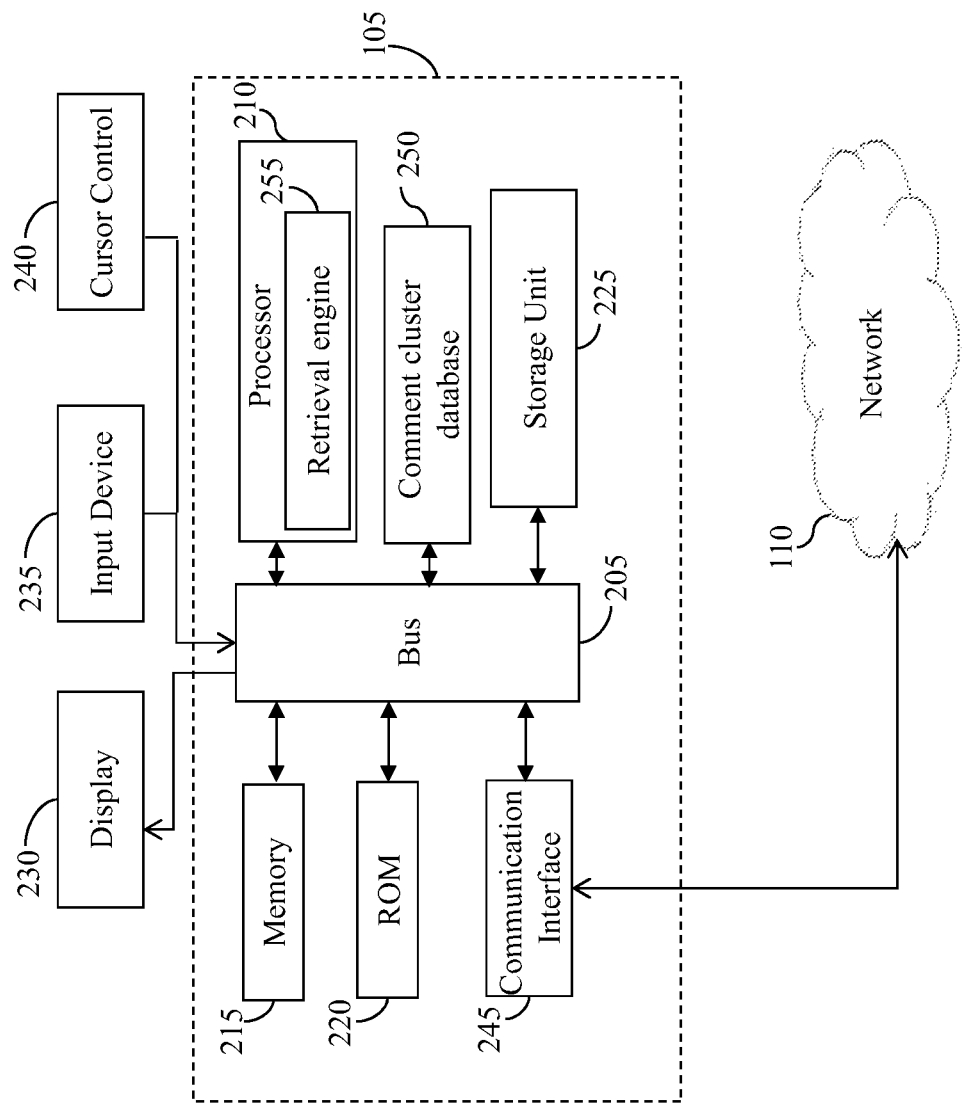
FIG. 2 is a block diagram of a server, in accordance with one embodiment.

FIG. 2 is a block diagram of a server, for example the server 105, in accordance with one embodiment.

The server 105 includes a bus 205 or other communication mechanism for communicating information, and a processor 210 coupled with the bus 205 for processing information. The server 105 also includes a memory 215, for example a random access memory (RAM) or other dynamic storage device, coupled to the bus 205 for storing information and instructions to be executed by the processor 210. The memory 215 can be used for storing temporary variables or other intermediate information during execution of instructions by the processor 210. The server 105 further includes a read only memory (ROM) 220 or other static storage device coupled to the bus 205 for storing static information and instructions for the processor 210. A storage unit 225, for example a magnetic disk or optical disk, is provided and coupled to the bus 205 for storing information, for example a plurality of comments provided by a plurality of users.

The server 105 can be coupled via the bus 205 to a display 230, for example a cathode ray tube (CRT), for displaying the comments to a user. The input device 235, including alphanumeric and other keys, is coupled to the bus 205 for communicating information and command selections to the processor 210. Another type of user input device is the cursor control 240, for example a mouse, a trackball, or cursor direction keys for communicating direction information and command selections to the processor 210 and for controlling cursor movement on the display 230.

Various embodiments are related to the use of the server 105 for implementing the techniques described herein. In some embodiments, the techniques are performed by the server 105 in response to the processor 210 executing instructions included in the memory 215. Such instructions can be read into the memory 215 from another machine-readable medium, for example the storage unit 225. Execution of the instructions included in the memory 215 causes the processor 210 to perform the process steps described herein.

In some embodiments, the processor 210 can include one or more processing units for performing one or more functions of the processor 210. The processing units are hardware circuitry used in place of or in combination with software instructions to perform specified functions.

The term "machine-readable medium" as used herein refers to any medium that participates in providing data that causes a machine to perform a specific function. In an embodiment implemented using the server 105, various machine-readable media are involved, for example, in providing instructions to the processor 210 for execution. The machine-readable medium can be a storage medium, either volatile or non-volatile. A volatile medium includes, for example, dynamic memory, for example the memory 215. A non-volatile medium includes, for example optical or magnetic disks, for example the storage unit 225. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic media, a CD-ROM, any other optical media, punchcards, papertape, any other physical media with patterns of holes, a RAM, a PROM, and EPROM, a FLASH-EPROM, any other memory chip or cartridge.

In another embodiment, the machine-readable media can be transmission media including coaxial cables, copper wire and fiber optics, including the wires that include the bus 205. Transmission media can also take the form of acoustic or light waves, such as those generated during radio-wave and infrared data communications. Examples of machine-readable media may include, but are not limited to, a carrier wave as described hereinafter or any other media from which the server 105 can read. For example, the instructions can initially be carried on a magnetic disk of a remote computer. The remote computer can load the instructions into its dynamic memory and send the instructions over a telephone line using a modem. A modem local to the server 105 can receive the data on the telephone line and use an infra-red transmitter to convert the data to an infra-red signal. An infra-red detector can receive the data carried in the infra-red signal and appropriate circuitry can place the data on the bus 205. The bus 205 carries the data to the memory 215, from which the processor 210 retrieves and executes the instructions. The instructions received by the memory 215 can optionally be stored on the storage unit 225 either before or after execution by the processor 210. All such media must be tangible to enable the instructions carried by the media to be detected by a physical mechanism that reads the instructions into a machine.

The server 105 also includes a communication interface 245 coupled to the bus 205. The communication interface 245 provides a two-way data communication coupling to the network 110. For example, the communication interface 245 can be an integrated services digital network (ISDN) card or a modem to provide a data communication connection to a corresponding type of telephone line. As another example, the communication interface 245 can be a local area network (LAN) card to provide a data communication connection to a compatible LAN. In any such implementation, the communication interface 245 sends and receives electrical, electromagnetic or optical signals that carry digital data streams representing various types of information.

The processor 210 included in the server 105 is operable to receive the query provided by the user. The processor 210 is also operable to retrieve a set of comment clusters from a comment cluster database 250 coupled to the processor 210. In some embodiments, the processor 210 includes a retrieval engine 255 that is operable to retrieve the set of comment clusters from the comment cluster database 250. The comment cluster database 250 stores a plurality of comment clusters associated with various queries. The comment clusters are formed by combining the comments, provided by the users, on the query. Each comment cluster of the set of comment clusters includes the comments associated with the query.

The processor 210 is also operable to select engaging comments from each comment cluster included in the set of comment clusters. The engaging comments are selected based on a degree of relevance associated with each of the engaging comments. The degree of relevance specifies the closeness of the comment with the query. The engaging comments from each comment cluster are identified based on a plurality of attributes. Examples of the attributes include, but are not limited to, number of likes, number of replies, number of votes and ratings, associated with comments included in the list of engaging comments.

The processor 210 is further configured to aggregate the engaging comments that are obtained from each comment cluster, with each other, to form a list of aggregated comments. Further, the processor 210 is operable to identify a plurality of independent comments included in the list of aggregated comments. The independent comments are classified into one or more topics associated with the query. Classification of the independent comments into the one or more topics enable the user to capture comments provided on diverse topics associated with the entity.

Furthermore, the processor 210 is configured to display a list of engaging comments to the user. The list of engaging comments, displayed to the user, corresponds to the one or more topics associated with the query. Hence the list of engaging comments, displayed to the user, enable the user to obtain diverse information associated with the query.

Figure 3:
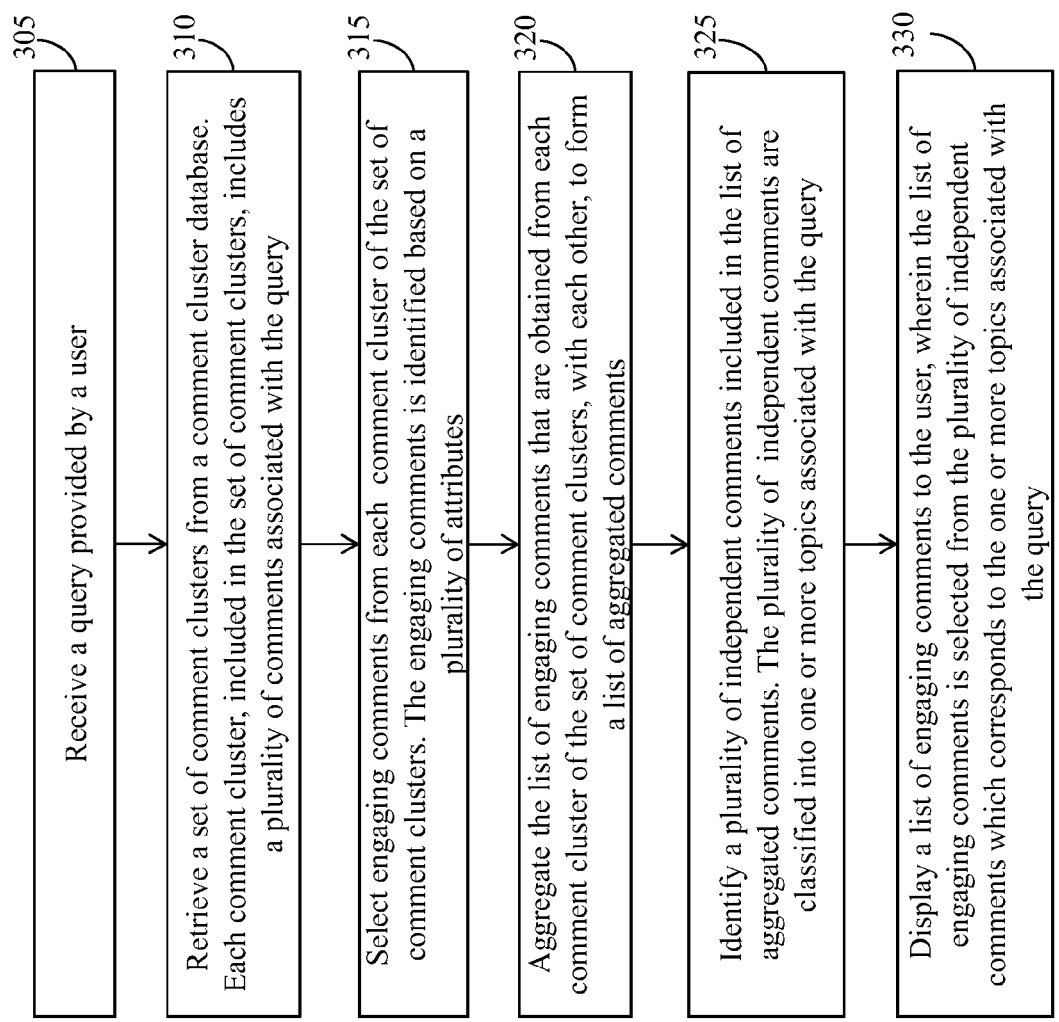
FIG. 3 is a flow diagram illustrating a method of displaying comments associated with a query, in accordance with one embodiment.

A method for displaying of the comments associated with the query is explained in detail in conjunction with FIG. 3.

FIG. 3 is a flow diagram illustrating a method of displaying comments associated with a query, in accordance with one embodiment.

At step 305, the query, provided by a user, is received. The query can be associated to, but is not limited to, products, services, sports personalities, celebrities, movies, videos, music, cities and monuments.

The query can be provided, by the user, in various ways via an electronic device, for example the electronic device 115. In one example, the query can be typed in a search box included in a web page. In another example, the user can click on the query, for example trending entities listed on the web page.

The query can be provided in various formats. Examples of the formats include, but are not limited to, text, image and voice.

At step 310, a set of comment clusters are retrieved from a comment cluster database, for example the comment cluster database 250. Each comment cluster included in the set of comment clusters includes a plurality of comments associated with the query. The comments are provided online by one or more users.

The comment cluster database includes a plurality of comment clusters associated with multiple queries. The comment clusters included in the comment cluster database are formed by combining the comments on the query that are provided by the users. The comment clusters are stored in the comment cluster database based on, but not limited to, geographical area and time.

A retrieval engine, for example the retrieval engine 255, included in a processor is used for retrieving the set of comment clusters from the comment cluster database. In some embodiments, for a given query, the retrieval engine employs one or more distance metric algorithms, for example, a cosine similarity algorithm, to retrieve the set of comment clusters.

At step 315, engaging comments are selected from each comment cluster of the set of comment clusters. The comments, included in the set of comment clusters possessing an increased relevance with regard to the query are referred to as the engaging comments.

The engaging comments are selected based on a plurality of attributes. Examples of the attributes include, but are not limited to, number of replies associated with the engaging comments, number of votes associated with the engaging comments, ratings provided to the engaging comments, reputation of one or more users providing the engaging comments and popularity of the engaging comments.

At step 320, the engaging comments, obtained from each comment cluster, included in the set of comment clusters, are aggregated, with each other, to form a list of aggregated comments. Various aggregating algorithms can be used for aggregating the list of engaging comments obtained from each comment cluster.

At step 325, a plurality of independent comments, included in the list of aggregated comments, are identified. The independent comments can also be referred to as self-contained comments. The independent comments are comments that are individual and are not reply comments.

In some embodiments, machine learning analytics can be used to identify the independent comments, included in the list of aggregated comments.

Further, the independent comments are classified into one or more topics associated with the query. The query can be associated with a pre-defined number of topics that are distinct with respect to each other.

In one example, if the query represents Barack Obama, then the topics include, but are not limited to, Barack Obama contesting for elections, presidential meetings addressed by Barack Obama and presidential trips made by Barack Obama. The independent comments provided on each of the topics are identified. Hence, diverse information associated with the query is provided to the user.

At step 330, a list of engaging comments is displayed, to the user, on the web page. The list of engaging comments is selected from the independent comments that are classified into the topics.

In one example, a list of engaging comments is formed by selecting a pre-defined number of the independent comments from each of the topics associated with the query. The pre-defined number of the independent comments from each of the topics is selected based on, but not limited to, a degree of relevance to the query and ranking associated with the independent comments. Hence, the list of engaging comments, displayed to the user, corresponds to diverse topics associated with the query.

In some embodiments, the list of engaging comments can include a well-defined number of the independent comments that can be varied with respect to time.

In some embodiments, a conversation tab can be presented, on the web page, to display the list of engaging comments to the user. The user can click on the conversation tab to view the engaging comments.

In some embodiments, one or more comments that are a subset of the list of engaging comments can be selected by a human editor. The comments are selected based on a click count associated with each comment. The click count can be referred to as total number of clicks performed on the comment by various users.

Further, the comments selected by the human editor are displayed to the user. Hence, displaying the comments selected by the human editor improves user experience.

The method specified in the present disclosure enables a user to view a list of engaging comments, associated with a query, that are provided by various users. By displaying the list of engaging comments, the user is enabled to obtain useful information associated with the query. Also, since the list of engaging comments are provided by anonymous users, the list of engaging comments are considered reliable, thereby enabling the user to make useful decisions. Further, the list of engaging comments corresponds to various topics associated with the query, thereby engaging attention of the user to a greater extent. Furthermore, the list of engaging comments is devoid of spam and abusive contents. Also, the list of engaging comments can be entry points to articles corresponding to the query, thereby increasing the network traffic to the web page hosting the articles.

It is to be understood that although various components are illustrated herein as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device.

Accordingly, the disclosure of the present invention is intended to be illustrative, but not limiting, of the scope of the invention, which is set forth in the following claims.

What is claimed is:

1. A method of displaying comments associated with a query, the method comprising:
   receiving the query provided by a user, the query identifying an entity;
   retrieving a set of comment clusters from a comment cluster database, wherein each comment cluster of the set of comment clusters comprises a plurality of comments associated with the entity identified in the query;
   selecting engaging comments from each comment cluster in the set of comment clusters,
   wherein the engaging comments are identified based on the comment having a high number of interactions with the comment by other users relative to other comments in the plurality of comments;
   aggregating the engaging comments that are selected from each comment cluster with each other to form a list of aggregated comments;
   classifying each engaging comments in the list of aggregated comments as related to a plurality of independent topics associated with the query,
   wherein each independent topic in the plurality of independent topics is related to a distinct topic subject matter associated with the entity identified in the query;
   identifying a first set of independent comments related to a first distinct topic subject matter associated with the entity identified in the query and a second set of independent comments related to a second distinct topic subject matter associated with the entity identified in the query;
   determining a first relevance of the first distinct topic subject matter to the query;
   determining a second relevance of the second distinct topic subject matter to the query, determining a first predefined number of independent comments based on the first relevance;
determining a second predefined number of independent comments based on the second relevance; and
displaying the first predefined number of independent comments from the first set of independent comments related to the first distinct topic subject matter associated with the entity identified in the query and displaying the second predefined number of independent comments from the second set of independent comments related to the second distinct topic subject matter associated with the entity identified in the query.

2. The method as claimed in claim 1, wherein the plurality of comments associated with the query is provided by a plurality of users.

3. The method as claimed in claim 1, wherein the comment cluster database comprises a plurality of comment clusters, the plurality of comment clusters being formed by combining the plurality of comments associated with the query.

4. The method as claimed in claim 1, wherein the plurality of comments associated with the query is obtained using distance metric algorithms.

5. The method as claimed in claim 1, wherein the plurality of independent comments is identified using machine learning analytics.

6. The method as claimed in claim 1, wherein each of the one or more topics associated with the query comprises a corresponding list of independent comments, the corresponding list of independent comments being a subset of the plurality of independent comments.

7. The method as claimed in claim 1 and further comprising:
selecting one or more comments using a human editor and further displaying the one or more comments to the user, the one or more comments being a subset of at least one set from the plurality of sets of independent comments.

8. A computer program product stored on a non-transitory computer-readable medium that when executed by a processor, performs a method of displaying comments associated with a query, the method comprising:
receiving the query provided by a user;
retrieving a set of comment clusters from a comment cluster database, wherein each comment cluster of the set of comment clusters, comprises a plurality of comments associated with the query;
selecting engaging comments from each comment cluster comprised in the set of comment clusters, wherein the engaging comments are identified based on a plurality of attributes;
aggregating the engaging comments that are obtained from each comment cluster, with each other, to form a list of aggregated comments;
classifying the engaging comments in the list of aggregated comments as related to one or more independent topics associated with the query, wherein each independent topic in the one or more independent topics is related to a different topic associated with the query;
identifying a first set of independent comments related to a first distinct topic associated the query and a second set of independent comments related to a second distinct topic associated the query from the list of aggregated comments based on the classification;
determining a first predefined number of independent comments from the first set of independent comments based on a first relevance of the first distinct topic to the query;
determining a second predefined number of independent comments from the second set of independent comments based on a second relevance of the second distinct topic to the query; and
displaying the first predefined number of independent comments from the first set of independent comments and the second predefined number of independent comments from the second set of independent comments.

9. The computer program product as claimed in claim 8, wherein the plurality of comments associated with the query is provided by a plurality of users.

10. The computer program product as claimed in claim 8, wherein the comment cluster database comprises a plurality of comment clusters, the plurality of comment clusters being formed by combining the plurality of comments associated with the query.

11. The computer program product as claimed in claim 8, wherein the plurality of comments associated with the query is obtained using distance metric algorithms.

12. The computer program product as claimed in claim 8, wherein the plurality of independent comments is identified using machine learning analytics.

13. The computer program product as claimed in claim 8, wherein each of the plurality of independent comments comprises a corresponding list of independent comments, the corresponding list of independent comments being a subset of the plurality of independent comments.

14. The computer program product as claimed in claim 8 and further comprising:
selecting one or more comments using a human editor and further displaying the one or more comments to the user, the one or more comments being a subset of the list of engaging comments.

15. A system for displaying comments associated with a query, the system comprising:
an electronic device;
a communication interface in electronic communication with the electronic device;
a memory that stores instructions; and
a processor responsive to the instructions to
receive the query provided by the user;
retrieve a set of comment clusters from a comment cluster database, wherein each comment cluster of the set of comment clusters, comprises a plurality of comments associated with the query;
select engaging comments from each comment cluster comprised in the set of comment clusters, wherein the engaging comments are identified based on a plurality of attributes;
aggregate the engaging comments that are obtained from each comment cluster, with each other, to form a list of aggregated comments;
classify the engaging comments in the list of aggregated comments as related to one or more different topics;
identify a first and second set of independent comments from the aggregated of comments, wherein the first and second sets are selected to include only engaging comments that are each related to different topics associated with the query provided by the user;
determine a first relevance of the topic for the first set of independent comments to the query and a second relevance of the topic for the second set of independent comments to the query; and
display a first predefined number of engaging comments from the first set of independent comments based on the first relevance and a second predefined number of engaging comments from the second set of independent comments based on the second relevance to the user as a list of independent comments.

16. The system as claimed in claim 15, wherein the comment cluster database comprises a plurality of comment clusters, the plurality of comment clusters being formed by combining the plurality of comments associated with the query.

17. The system as claimed in claim 15, wherein the processor further comprises a retrieval engine to retrieve the set of comment clusters from the comment cluster database.

\* \* \* \* \*